(No Model.)
J. F. PIPER.
DEVICE FOR REAMING AND TAPPING.
No. 277,507. Patented May 15, 1883.
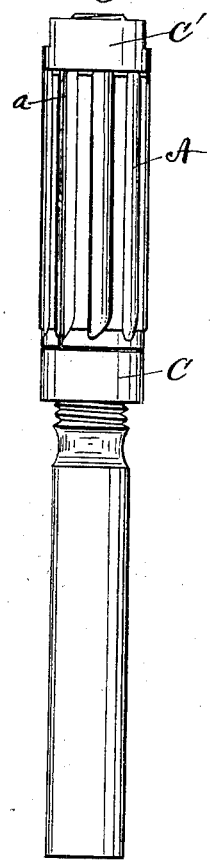
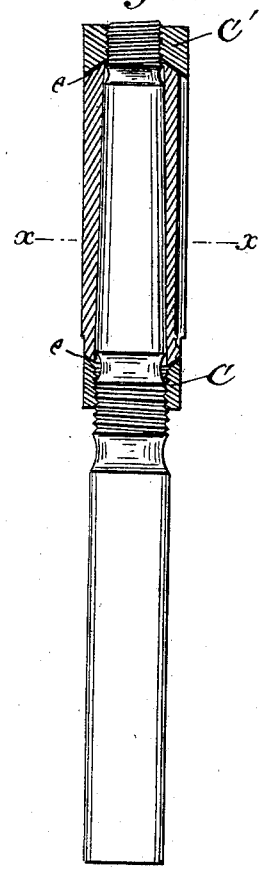
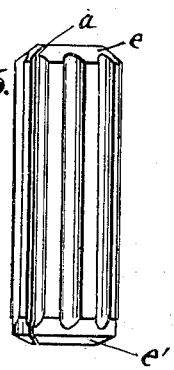
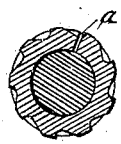
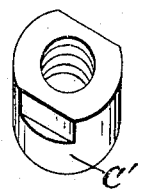
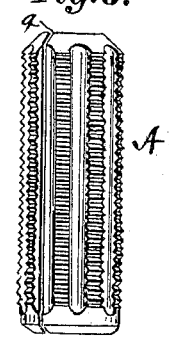
Attest  
E. N. Wild  
Joseph A. Mayer
Inventor  
J. Frederic Piper  
by L. M. Hosea, Attorney

UNITED STATES PATENT OFFICE.

J. FREDERIC PIPER, OF NEWPORT, KENTUCKY, ASSIGNOR TO H. BICKFORD, OF CINCINNATI, OHIO.

DEVICE FOR REAMING AND TAPPING.

SPECIFICATION forming part of Letters Patent No. 277,507, dated May 15, 1883.

Application filed January 2, 1883. (No model.)

*To all whom it may concern:*

Be it known that I, J. FREDERIC PIPER, a citizen of the United States, residing at Newport, Campbell county, Kentucky, have invented new and useful Improvements in Metal-Working Tools, of which the following is a specification.

My invention relates to metal-working tools—such as reamers, taps, &c.—designed to operate upon the wall or periphery of a cylindrical perforation, either to enlarge the aperture to a given dimension or to dress the same to a given contour, as in tapping the same for the insertion of a bolt; and it consists in an improved construction of such tools, whereby the cutting-section may be enlarged as may be required to compensate the loss of wear, and preserve thereby a standard diameter.

To this end my invention consists in a tool for cutting and dressing the interior surfaces of circular perforations in metal, embodying an annular conically-bored shell with external cutting-edges and beveled ends, and divided longitudinally at one side throughout its length, combined with a conical mandrel provided with opposite threaded concaved adjusting-nuts, all as hereinafter more fully described.

Mechanism embodying my invention is illustrated in the accompanying drawings, in which Figure 1 is a side elevation of a reamer constructed according to my improvement. Fig. 2 is a longitudinal section of the same. Fig. 3 is a cross-section taken on the plane $x\ x$. Fig. 4 is a detached view of the conical portion of the mandrel or arbor. Fig. 5 is a detached view of the reamer-shell. Fig. 6 is a detached view of a shell having screw-cutting surfaces adapted for use as a tap. Fig. 7 is a perspective view of the outer nut or head.

Referring to the drawings, A designates the shell constituting the reamer proper, and B its arbor or mandrel. The shell A is of steel, longitudinally fluted on its peripheral surface with cutting-edges, as is customary, and is slit longitudinally throughout its length, as shown at $a$. The shell A is further beveled at its extreme annular edges, as shown at $e\ e'$, and its axial perforation is slightly conical to fit accurately the conical arbor B. The arbor B is conical for a portion of its length corresponding with the shell A, and is threaded at each end of the conical portion to carry a right-hand nut, C′, and a left-hand nut, C, these nuts being concaved on their corresponding sides to fit the beveled ends of the shell A, as shown. It will be readily seen that by loosening the nut C and tightening the nut C′ the shell will be forced upward over the enlarged portion of the arbor B, and thereby expanded to any dimension within the limit provided in the construction of the parts by the opening of the slit $a$. Any tendency of the shell to open unevenly is corrected by the action of the conical nuts C C′ acting upon the beveled ends $e\ e'$ of the shell. When the shell becomes worn and reduced in diameter by use it is enlarged in the manner indicated to the desired diameter and securely held by tightening the nuts C C′, which tend to compress the shell uniformly at both ends toward the central axis and seat it firmly upon the arbor. The friction induced by such compression is ordinarily sufficient to prevent the shell from rotating upon the arbor; but should it do so the effect would be to tighten the nuts C C′ and increase the compression. A feather or spline may be inserted in the taper portion of the arbor to engage in the slot $a$ of the shell, if deemed necessary, to prevent the rotation of the shell.

It will be obvious that the principle of my invention may be applied with equal advantage to a tap-shell constructed as shown in Fig. 6, and that a series of reamer or tap shells may be arranged to be used successively on the same arbor.

Instead of concave nuts C C′, concave washers with nuts of the ordinary construction may be employed. The nuts may also be suitably engraved on the periphery, one or both, to register with corresponding marks upon the end of the arbor, or upon the hollow shell, said marks bearing a fixed relation to the pitch of the screw-threads and the conical angle of the arbor to determine the degree of enlargement of the shell with a given rotation of the nuts.

I claim as new and desire to secure by Letters Patent—

A tool for cutting and dressing the interior surfaces of circular perforations in metal, consisting of an annular conically-bored shell with exterior cutting-edges, beveled ends, and divided longitudinally throughout its length at one side, in combination with a conical arbor or mandrel provided with opposite threaded concaved nuts for adjusting and thereby expanding the shell upon its mandrel, substantially as set forth.

In testimony whereof I have hereunto set my hand in the presence of two subscribing witnesses.

J. FREDERIC PIPER.

Witnesses:
L. M. HOSEA,
JOSEPH KLAYER.